US012706953B2

(12) United States Patent
Shiffer et al.

(10) Patent No.: US 12,706,953 B2
(45) Date of Patent: Aug. 11, 2026

(54) EMBEDDED AND DISTRIBUTABLE POLICY ENFORCEMENT

(71) Applicant: Atscale, Inc., San Mateo, CA (US)

(72) Inventors: Jason L. Shiffer, Wilmot, NH (US); Kaushik Shanadi, Washington, DC (US); Dustin W. Webber, Dorchester, MA (US); Patrick J. Toole, Wellington, FL (US)

(73) Assignee: AtScale, Inc., Boston, MA (US)

( * ) Notice: Subject to any disclaimer, the term of this patent is extended or adjusted under 35 U.S.C. 154(b) by 566 days.

(21) Appl. No.: 17/733,028

(22) Filed: Apr. 29, 2022

(65) Prior Publication Data

US 2022/0353298 A1 Nov. 3, 2022

Related U.S. Application Data

(60) Provisional application No. 63/182,918, filed on May 1, 2021.

(51) Int. Cl.
*H04L 9/40* (2022.01)
*G06F 9/54* (2006.01)
*G06F 21/62* (2013.01)

(52) U.S. Cl.
CPC .............. *H04L 63/20* (2013.01); *G06F 9/547* (2013.01); *G06F 21/6218* (2013.01); (Continued)

(58) Field of Classification Search
None
See application file for complete search history.

(56) References Cited

U.S. PATENT DOCUMENTS 6,021,438 A * 2/2000 Duvvoori .............. G06F 21/105 712/210
7,349,949 B1 * 3/2008 Connor ............... H04L 63/0815 709/200

(Continued)

FOREIGN PATENT DOCUMENTS

EP 3793151 A1 * 3/2021 .......... H04L 5/0012

OTHER PUBLICATIONS

Alkhresheh et al DACIoT: Dynamic Access Control Framework for IoT Deployments, IEEE Internet of Things Journal, vol. 7, No. 12, Dec. 2020, pp. 11401-11409, (Year: 2020).*

(Continued)

*Primary Examiner* — Luu T Pham
*Assistant Examiner* — James J Wilcox
(74) *Attorney, Agent, or Firm* — Armis IP Law, LLC

(57) ABSTRACT

A network device for enforcing an authorization policy to a database includes identifying an authorization policy based on declarative designations of a set of objects, subjects and actions affected by an access request, and distributing the executable entity to a plurality if endpoints of a network of users. Each endpoint of the plurality of endpoints has one or more client applications. The endpoint embeds the executable entity in the client application, the executable entity responsive to access requests from the client application, and the endpoint node grants the access request based on evaluating the access request against the authorization policy, evaluating based only on instructions in the executable entity.

13 Claims, 4 Drawing Sheets

(52) U.S. Cl.
CPC ...... *H04L 63/10* (2013.01); *G06F 2221/2115* (2013.01); *G06F 2221/2141* (2013.01)

(56) References Cited

U.S. PATENT DOCUMENTS 7,359,982 B1 * 4/2008 Connor ..................... G06F 8/20 709/217
7,614,077 B2 * 11/2009 Brew ..................... G06F 21/10 713/176
7,698,398 B1 * 4/2010 Lai ..................... G06Q 30/00 709/228
7,822,825 B2 * 10/2010 De Luca ............. H04L 67/1097 709/219
8,042,120 B2 * 10/2011 Laborczfalvi ........... G06F 9/545 709/218
8,069,435 B1 * 11/2011 Lai ..................... H04L 67/51 717/106
8,095,940 B2 * 1/2012 Bissett .................. G06F 9/4488 719/329
8,171,479 B2 * 5/2012 Laborczfalvi ............. G06F 9/52 719/321
8,346,929 B1 * 1/2013 Lai ..................... H04L 67/51 709/226
8,595,186 B1 * 11/2013 Mandyam ................. G06F 8/38 717/178
8,832,855 B1 * 9/2014 Enderwick ............. H04L 67/10 726/28
9,152,808 B1 * 10/2015 Ramalingam ........... G06F 21/62
9,208,332 B2 * 12/2015 Leach ................... G06Q 10/06
9,306,943 B1 * 4/2016 Bailey ................. H04W 12/088
9,450,817 B1 * 9/2016 Bahadur ............... H04L 41/122
9,467,925 B1 * 10/2016 Baroudi .............. H04L 41/0803
9,501,708 B1 * 11/2016 Ahmad ................ G06V 30/245
9,569,634 B1 * 2/2017 Yanacek ............. G06F 21/6218
9,602,482 B1 * 3/2017 Roth ..................... H04L 63/08
9,843,624 B1 * 12/2017 Taaghol .............. H04L 41/0895
9,922,192 B1 * 3/2018 Kashyap ............. G06F 9/45533
9,928,379 B1 * 3/2018 Hoffer .................... G16H 50/20
9,953,527 B1 * 4/2018 Alhazmi ................... E01C 1/02
10,050,957 B1 * 8/2018 Farrugia ............. H04L 63/0853
10,078,751 B2 * 9/2018 Austin .................. H04L 67/306
10,303,892 B1 * 5/2019 Lim ...................... G06F 16/951
10,356,128 B1 * 7/2019 Lango ................. H04L 63/0263
10,454,786 B2 * 10/2019 Collins ................... H04L 67/30
10,509,914 B1 * 12/2019 Desai .................... G06F 21/604
10,592,302 B1 * 3/2020 Hinrichs ................. H04L 63/20
10,592,683 B1 * 3/2020 Lim ...................... H04L 63/102
10,609,165 B1 * 3/2020 Chauhan ................. H04L 67/02
10,652,281 B1 * 5/2020 Moolenaar .......... H04L 63/0236
10,719,373 B1 * 7/2020 Koponen .................. G06F 9/54
10,878,079 B2 * 12/2020 Vepa ..................... G06F 21/335
10,904,012 B1 * 1/2021 Duncan ................. H04L 9/3247
10,924,482 B1 * 2/2021 Roth ..................... H04L 63/10
11,032,160 B1 * 6/2021 Raheja ................ H04L 41/0843
11,080,410 B1 * 8/2021 Sandall ................... G06F 21/53
11,108,828 B1 * 8/2021 Curtis ..................... H04L 63/20
11,153,412 B1 * 10/2021 Varadan ................ H04L 67/133
11,165,888 B1 * 11/2021 Tomes .................. H04L 67/133
11,170,099 B1 * 11/2021 Sandall ................... G06F 9/547
11,228,573 B1 * 1/2022 Rangasamy ...... H04L 12/40006
11,361,075 B1 * 6/2022 Singh .................... G06T 7/0002
11,477,239 B1 * 10/2022 Curtis ..................... H04L 63/08
11,494,518 B1 * 11/2022 Curtis ................... G06F 21/629
11,502,992 B1 * 11/2022 Koponen .............. H04L 67/562
11,575,714 B2 * 2/2023 Weiss .................. H04W 12/086
11,595,372 B1 * 2/2023 Sharifi Mehr .......... H04L 47/20
11,681,568 B1 * 6/2023 Hinrichs ................. H04L 67/10 726/1
11,818,134 B1 * 11/2023 Gibson ................. H04L 63/102
11,853,463 B1 * 12/2023 Hinrichs ............... G06F 21/629
11,995,214 B2 * 5/2024 Mosconi ............... G06F 21/121
12,003,543 B1 * 6/2024 Ali ........................ H04L 63/123
12,034,844 B1 * 7/2024 Grubin ...................... H04L 9/14
12,079,372 B1 * 9/2024 Hall .................... G06F 21/6254
12,244,621 B1 * 3/2025 Kapoor ................... H04L 43/06
12,348,519 B1 * 7/2025 Hassey ................... H04L 63/20
12,355,817 B2 * 7/2025 Iyer ......................... H04L 63/10
12,407,701 B1 * 9/2025 Varakantam .......... H04L 67/306
12,417,317 B1 * 9/2025 LaFever .............. G06F 21/6254
12,418,552 B1 * 9/2025 Karaje .................. H04L 43/045
12,423,388 B2 * 9/2025 Horton .................. G06F 16/632
12,463,994 B1 * 11/2025 Tock ................... G06F 11/3438
12,500,912 B1 * 12/2025 Erlingsson .......... H04L 63/1425
12,511,110 B1 * 12/2025 Maya ........................ G06F 8/61
12,537,840 B1 * 1/2026 Sakhadeo ............... G06F 9/455
12,549,574 B1 * 2/2026 Morgan .............. H04L 63/1416
12,563,060 B1 * 2/2026 Sobrier ............... H04L 63/1425
12,580,934 B1 * 3/2026 Adamson ............ H04L 63/1425
2002/0002577 A1 * 1/2002 Garg ..................... G06F 9/4488 718/104
2002/0087686 A1 * 7/2002 Cronk ..................... H04L 67/02 707/E17.119
2003/0088786 A1 * 5/2003 Moran .................. H04L 63/102 726/4
2003/0131245 A1 * 7/2003 Linderman ......... H04L 63/0218 713/176
2003/0145094 A1 * 7/2003 Staamann ........... H04L 63/0281 709/229
2004/0039827 A1 * 2/2004 Thomas ................ H04L 67/564 709/228
2004/0199763 A1 * 10/2004 Freund .................. H04L 63/104 726/2
2005/0044197 A1 * 2/2005 Lai ......................... H04L 67/02 709/223
2005/0102530 A1 * 5/2005 Burrows ............. G06F 21/6218 726/1
2005/0149726 A1 * 7/2005 Joshi ....................... G06F 21/51 726/4
2005/0168766 A1 * 8/2005 Troyansky ............ G06F 21/608 358/1.14
2005/0187930 A1 * 8/2005 Subramanian ...... G06F 11/3668
2005/0193266 A1 * 9/2005 Subramanian ...... G06F 11/3692 714/6.1
2005/0193291 A1 * 9/2005 Subramanian ...... G06F 11/3664 714/710
2007/0033419 A1 * 2/2007 Kocher ............ G11B 20/00884 713/193
2007/0101435 A1 * 5/2007 Konanka ................. G06F 21/57 713/193
2007/0240212 A1 * 10/2007 Matalytski ............ G06F 21/552 726/22
2007/0283192 A1 * 12/2007 Shevchenko ......... G06F 21/554 714/39
2008/0043749 A1 * 2/2008 Suganthi ............. H04L 12/4641 370/395.52
2008/0043761 A1 * 2/2008 Kumar ................ H04L 61/5061 370/389
2008/0046994 A1 * 2/2008 Venkatraman ...... H04L 63/0272 726/15
2008/0072281 A1 * 3/2008 Willis ................... H04L 63/102 726/1
2008/0072282 A1 * 3/2008 Willis ................... H04L 63/102 726/1
2008/0082823 A1 * 4/2008 Starrett ................... H04L 9/083 713/171
2009/0037763 A1 * 2/2009 Adhya .................. H04L 63/166 714/4.12
2009/0037998 A1 * 2/2009 Adhya ..................... H04L 69/40 726/11
2009/0063665 A1 * 3/2009 Bagepalli ................ H04L 63/02 710/100
2009/0067440 A1 * 3/2009 Chadda ............... H04L 63/0227 370/401
2009/0178061 A1 * 7/2009 Sandoval ................ H04L 67/02 719/328
2009/0204964 A1 * 8/2009 Foley ...................... G06F 21/53 718/1
2009/0237418 A1 * 9/2009 Nave ....................... H04L 67/34 345/629

(56) References Cited

U.S. PATENT DOCUMENTS

2009/0288105 A1* 11/2009 Wookey ................ H04L 69/328 719/328
2010/0024036 A1* 1/2010 Morozov ................ G06F 21/53 726/26
2010/0161960 A1* 6/2010 Sadasivan ........... H04L 63/1408 713/152
2011/0113484 A1* 5/2011 Zeuthen ................ H04L 63/102 726/19
2011/0185073 A1* 7/2011 Jagadeeswaran ..... H04L 69/163 709/228
2011/0219385 A1* 9/2011 Jacobson ............ G06F 9/45558 709/224
2011/0314261 A1* 12/2011 Brucker .............. G06F 21/6218 712/E9.055
2011/0314270 A1* 12/2011 Lifliand .................. H04L 63/30 713/151
2012/0036244 A1* 2/2012 Ramachandra ..... H04L 41/0806 709/223
2012/0060207 A1* 3/2012 Mardikar ................ H04L 63/20 726/4
2012/0216244 A1* 8/2012 Kumar .................... G06F 21/31 726/1
2012/0221955 A1* 8/2012 Raleigh ................. H04M 15/58 726/1
2012/0226742 A1* 9/2012 Momchilov .......... G06F 3/0481 709/203
2012/0311674 A1* 12/2012 Hockings ............ G06F 21/6218 726/4
2012/0324225 A1* 12/2012 Chambers ............. H04L 9/0891 713/169
2012/0324365 A1* 12/2012 Momchilov ............ H04L 67/10 715/738
2012/0324418 A1* 12/2012 Fallon ...................... G06F 8/36 717/101
2013/0124373 A1* 5/2013 Wurzer ............. G06Q 30/0641 705/27.1
2013/0139241 A1* 5/2013 Leeder ................ H04W 12/068 726/9
2013/0149996 A1* 6/2013 King ................. H04W 12/0431 455/411
2013/0160147 A1* 6/2013 Draluk .................... G06F 21/51 726/30
2013/0212288 A1* 8/2013 Jakubowski .......... H04W 28/20 709/228
2013/0219456 A1* 8/2013 Sharma ................. H04L 9/0894 726/1
2013/0268645 A1* 10/2013 Shah ................... H04L 41/0273 709/223
2014/0082717 A1* 3/2014 Kang ...................... G06F 21/34 726/9
2014/0157351 A1* 6/2014 Canning ............... H04W 12/37 726/1
2014/0181517 A1* 6/2014 Alaranta ............... H04L 63/062 713/168
2014/0337914 A1* 11/2014 Canning ................. H04L 63/10 726/1
2014/0344232 A1* 11/2014 Kludy ................... G06F 40/174 707/694
2015/0046289 A1* 2/2015 Carey ................ G06Q 30/0625 705/26.62
2015/0089623 A1* 3/2015 Sondhi .................. H04L 63/205 726/9
2015/0143456 A1* 5/2015 Raleigh ................... H04L 63/20 726/1
2016/0006800 A1* 1/2016 Summers ............ H04L 67/1072 709/203
2016/0006803 A1* 1/2016 Kumar ................ H04L 67/1091 719/329
2016/0028737 A1* 1/2016 Srinivasan .......... H04L 63/0807 726/4
2016/0077901 A1* 3/2016 Roth ....................... G06F 9/547 719/328
2016/0173529 A1* 6/2016 Baig ................... H04L 63/1408 726/13
2016/0277413 A1* 9/2016 Ajitomi ................... H04L 67/12
2016/0306964 A1* 10/2016 Austin .................. G06F 21/556
2016/0356665 A1* 12/2016 Felemban ........... G01M 3/2807
2016/0356666 A1* 12/2016 Bilal ................... G01M 3/2807
2016/0371617 A1* 12/2016 Mullaney ........... G06Q 10/0635
2016/0381023 A1* 12/2016 Dulce ................. H04L 63/1408 726/9
2017/0004291 A1* 1/2017 Pathak ................ G06F 21/1063
2017/0004292 A1* 1/2017 Pathak .................... G06F 21/10
2017/0017846 A1* 1/2017 Felemban .............. G06V 20/53
2017/0019454 A1* 1/2017 Almohamedh ......... H04L 69/24
2017/0104826 A1* 4/2017 Sait .................. G05B 19/41855
2017/0132419 A1* 5/2017 Gupta ....................... G06F 8/65
2017/0220782 A1* 8/2017 Alsanousi .............. H04W 4/00
2017/0238197 A1* 8/2017 Baroudi .................. H04L 45/22 370/225
2017/0243009 A1* 8/2017 Sejpal ................... G06F 21/577
2017/0261949 A1* 9/2017 Hoffmann ................ G06N 7/01
2017/0329957 A1* 11/2017 Vepa ..................... G06F 21/445
2017/0331802 A1* 11/2017 Keshava .............. H04L 9/0894
2017/0331829 A1* 11/2017 Lander ................ G06F 21/6218
2017/0331832 A1* 11/2017 Lander .................. H04L 63/102
2017/0339163 A1* 11/2017 Alhothaily ............ H04L 63/108
2017/0344900 A1* 11/2017 Alzahrani ............ G06F 16/435
2017/0346851 A1* 11/2017 Drake ................... H04L 9/0838
2017/0374044 A1* 12/2017 Alyubi ................ H04L 63/0485
2018/0011723 A1* 1/2018 Saxena ................... G06F 9/455
2018/0027992 A1* 2/2018 Schiffman ............... A47F 10/00
2018/0039501 A1* 2/2018 Jain ....................... H04L 43/045
2018/0041336 A1* 2/2018 Keshava ............... H04L 9/0891
2018/0041491 A1* 2/2018 Gupta ..................... G06F 9/547
2018/0059062 A1* 3/2018 Saleem .................... G01N 3/34
2018/0091583 A1* 3/2018 Collins ............... H04L 41/5003
2018/0091989 A1* 3/2018 Baroudi .................. H04W 4/70
2018/0131685 A1* 5/2018 Sridhar ................ H04L 9/3226
2018/0136976 A1* 5/2018 Ammari .................. G06F 9/505
2018/0157467 A1* 6/2018 Stachura ................ G06F 40/18
2018/0157468 A1* 6/2018 Stachura ................... G06F 8/34
2018/0157524 A1* 6/2018 Saxena .................. G06N 20/00
2018/0174449 A1* 6/2018 Nguyen ................. G08G 1/096
2018/0181451 A1* 6/2018 Saxena ................. G06F 21/629
2018/0227300 A1* 8/2018 Nakic ................. H04L 63/0442
2018/0279002 A1* 9/2018 Cugi .................. H04N 21/4627
2018/0290609 A1* 10/2018 Khoo ..................... G07C 5/008
2018/0295134 A1* 10/2018 Gupta ..................... H04L 67/56
2018/0305905 A1* 10/2018 Carey ..................... E03B 7/074
2018/0309795 A1* 10/2018 Ithal ........................ H04L 63/20
2018/0324201 A1* 11/2018 Lowry ................ H04L 63/1441
2018/0329741 A1* 11/2018 Yuan ..................... G06F 1/3228
2018/0359323 A1* 12/2018 Madden .............. H04L 12/4633
2018/0372709 A1* 12/2018 Cline ................... G01N 33/225
2019/0020665 A1* 1/2019 Surcouf ................ H04L 9/3236
2019/0052621 A1* 2/2019 Sahraei ................... H04L 63/10
2019/0089705 A1* 3/2019 Chud .................... H04L 63/102
2019/0095183 A1* 3/2019 Shukla .................... G06F 21/52
2019/0095516 A1* 3/2019 Srinivasan ............ H04L 63/102
2019/0098578 A1* 3/2019 Baroudi ................ H04W 84/18
2019/0104196 A1* 4/2019 Li ...................... G06Q 20/3823
2019/0132381 A1* 5/2019 Momchilov .......... G06F 3/0481
2019/0138715 A1* 5/2019 Shukla .................... G06F 21/54
2019/0155597 A1* 5/2019 Lander .................... H04L 45/02
2019/0158275 A1* 5/2019 Beck .................. G06Q 20/0658
2019/0164229 A1* 5/2019 Sbianchi ................ G07C 5/008
2019/0180036 A1* 6/2019 Shukla .................... G06F 9/542
2019/0205045 A1* 7/2019 Hugot ................... G06F 3/0637
2019/0238598 A1* 8/2019 Mohamad Abdul ........................ H04L 63/0807
2019/0243964 A1* 8/2019 Shukla .................... G06F 21/54
2019/0246248 A1* 8/2019 Baroudi ................ H04W 24/02
2019/0306010 A1* 10/2019 Medam ................. G06F 16/184
2019/0306138 A1* 10/2019 Carru .................. H04L 63/0807
2019/0312857 A1* 10/2019 Lander .................. H04L 9/3271
2019/0349756 A1* 11/2019 Bang ................... H04W 12/082
2020/0007311 A1* 1/2020 Oberhofer ............. H04L 63/102
2020/0007530 A1* 1/2020 Mohamad Abdul ........................ H04W 12/084
2020/0026871 A1* 1/2020 Mikhailov ............ G06F 21/629

(56) References Cited

U.S. PATENT DOCUMENTS

2020/0089901 A1* 3/2020 Zeuthen ................ H04L 63/102
2020/0094110 A1* 3/2020 Chapman ............... G16H 20/30
2020/0125455 A1* 4/2020 Neelakanteshwar ........................ G06F 9/4451
2020/0127839 A1* 4/2020 Alzahrani ............ H04L 9/3231
2020/0127994 A1* 4/2020 Kukreja .................. G06F 21/31
2020/0142544 A1* 5/2020 Fleck ...................... G06F 9/451
2020/0145384 A1* 5/2020 Chauhan ............... H04W 12/69
2020/0145459 A1* 5/2020 Feutz .................... H04L 63/062
2020/0151345 A1* 5/2020 Chauhan ................. G06F 21/16
2020/0162462 A1* 5/2020 Zayats .................. H04L 41/082
2020/0250176 A1* 8/2020 Padmanabhan ....... H04L 9/3239
2020/0250177 A1* 8/2020 Padmanabhan ....... G06F 16/214
2020/0250295 A1* 8/2020 Padmanabhan ....... H04L 63/102
2020/0250664 A1* 8/2020 Kumar ................ H04L 63/0838
2020/0251067 A1* 8/2020 Tyler ...................... G09G 5/363
2020/0252404 A1* 8/2020 Padmanabhan ....... H04L 63/061
2020/0252406 A1* 8/2020 Padmanabhan ....... H04L 9/3271
2020/0257700 A1* 8/2020 Xu ........................ G06F 16/213
2020/0265062 A1* 8/2020 Srinivasan ............ G06F 9/4416
2020/0272670 A1* 8/2020 Vaishnavi ............... G06F 9/541
2020/0342132 A1* 10/2020 Youssef .............. G06F 16/1834
2020/0343731 A1* 10/2020 Hassan ................. H02M 7/493
2020/0344132 A1* 10/2020 Padmanabhan ....... H04L 9/0637
2020/0344233 A1* 10/2020 Lai ..................... G06Q 20/4014
2020/0365015 A1* 11/2020 Nguyen ............... G08G 1/0129
2020/0374106 A1* 11/2020 Padmanabhan ....... H04L 63/105
2020/0382323 A1* 12/2020 Keselman ........... H04L 63/0823
2020/0389531 A1* 12/2020 Lee ......................... H04L 67/52
2021/0003626 A1* 1/2021 Al-Khabbaz ........ G01R 31/086
2021/0026751 A1* 1/2021 Larkin .................. G06F 11/324
2021/0029170 A1* 1/2021 Gupta ................... G06F 21/554
2021/0073374 A1* 3/2021 Mookken ................ G06F 21/54
2021/0081252 A1* 3/2021 Bhargava ............ H04L 67/1019
2021/0084031 A1* 3/2021 Lao ..................... H04L 63/0846
2021/0097174 A1* 4/2021 Mandal ................. G06F 21/554
2021/0097186 A1* 4/2021 Mandal ................. G06F 21/552
2021/0117242 A1* 4/2021 Van De Groenendaal .................. H04L 67/51
2021/0117246 A1* 4/2021 Lal ........................ G06F 9/3814
2021/0152542 A1* 5/2021 Gimenez Palop ...... G06F 21/45
2021/0182423 A1* 6/2021 Padmanabhan ....... H04L 9/3271
2021/0196227 A1* 7/2021 Salinas .................. A61B 8/465
2021/0200864 A1* 7/2021 Rudnik ................. G06F 21/567
2021/0226774 A1* 7/2021 Padmanabhan ....... H04L 9/0643
2021/0243193 A1* 8/2021 Padmanabhan ....... G06F 16/252
2021/0248904 A1* 8/2021 Nguyen ................. G08G 1/012
2021/0281555 A1* 9/2021 He ...................... H04L 63/0807
2021/0314342 A1* 10/2021 Oberg ..................... H04L 63/20
2021/0352077 A1* 11/2021 Benedetti ................ G06F 16/27
2021/0352097 A1* 11/2021 Vlahovic .............. H04L 63/102
2021/0373860 A1* 12/2021 Khan ...................... G06F 9/546
2022/0014512 A1* 1/2022 Raleigh ................... H04L 63/20
2022/0035689 A1* 2/2022 Raheja .................. G06F 9/5011
2022/0043731 A1* 2/2022 Larson ................... G06F 17/18
2022/0043902 A1* 2/2022 Olson ....................... H04L 9/30
2022/0060470 A1* 2/2022 Thomas .............. H04L 63/0815
2022/0108026 A1* 4/2022 Ortiz ................... G06F 12/1408
2022/0114257 A1* 4/2022 McKerchar ......... G06F 9/45558
2022/0156387 A1* 5/2022 Keller ................... G06F 21/554
2022/0166776 A1* 5/2022 Lee ....................... H04W 48/16
2022/0201597 A1* 6/2022 Kim ...................... H04L 9/3213
2022/0247686 A1* 8/2022 Rajagopalan ........... H04L 67/51
2022/0255916 A1* 8/2022 Smith ................... H04L 9/3247
2022/0286360 A1* 9/2022 Gali ........................ H04L 41/40
2022/0321540 A1* 10/2022 Loman .................. H04L 67/146
2022/0343399 A1* 10/2022 Filipovich .......... G06Q 30/0635
2022/0350900 A1* 11/2022 Shiffer .................... H04L 63/20
2022/0353241 A1* 11/2022 Shiffer ................ H04L 63/0281
2022/0353298 A1* 11/2022 Shiffer .................... H04L 63/10
2022/0417035 A1* 12/2022 Guilford ................. H04L 63/10
2023/0049227 A1* 2/2023 Bouffard ............ H04L 63/0435
2023/0054446 A1* 2/2023 LaFever ................ H04W 12/75
2023/0138013 A1* 5/2023 Chen ....................... G06F 21/53 726/23
2023/0168986 A1* 6/2023 Larkin ................... G06N 20/00 717/127
2023/0188525 A1* 6/2023 Singh .................... H04L 63/101 726/29
2023/0254330 A1* 8/2023 Singh ...................... G06F 21/57 726/23
2023/0325501 A1* 10/2023 Chhetri ................. G06F 21/566 726/24
2023/0336592 A1* 10/2023 Narayanaswamy .... H04L 63/20
2023/0421732 A1* 12/2023 Tal ....................... G08G 1/0141
2024/0129321 A1* 4/2024 Howe ..................... H04L 63/20
2024/0144269 A1* 5/2024 Szigeti .................... H04L 63/20
2024/0169084 A1* 5/2024 Majid ................. G06F 21/6218
2024/0171588 A1* 5/2024 Majid ................... H04L 63/107
2024/0267361 A1* 8/2024 Weiss ...................... H04L 63/20
2024/0289745 A1* 8/2024 Larkin .................. G06F 21/572
2024/0303171 A1* 9/2024 Larkin .................... G06F 9/545
2024/0303172 A1* 9/2024 Larkin ................ G06F 11/3072
2024/0320338 A1* 9/2024 Chhetri ................ G06N 3/0464
2024/0378107 A1* 11/2024 Merchant ............ G06F 11/0793
2025/0045094 A1* 2/2025 Newburn ................ G06F 9/485
2025/0053685 A1* 2/2025 Hall .................... G06F 21/6254
2025/0080503 A1* 3/2025 Obulareddy ........ H04L 63/0272
2025/0094317 A1* 3/2025 Larkin ................ G06F 11/3612
2025/0110619 A1* 4/2025 Singh .................... G06F 3/0484
2025/0139281 A1* 5/2025 Liao ...................... G06F 21/554
2025/0190541 A1* 6/2025 Vemula ................. G06F 21/604
2025/0220420 A1* 7/2025 Kuravangi-Thammaiah ............... H04W 12/06
2025/0265056 A1* 8/2025 Kamity ................... G06F 8/433
2025/0272361 A1* 8/2025 Horton ................ G06F 21/1084
2025/0291512 A1* 9/2025 Gilchrist ............ G06Q 20/3827
2025/0298893 A1* 9/2025 Strogov ................ G06F 21/554
2025/0301034 A1* 9/2025 Gurin ...................... H04L 67/02
2025/0310352 A1* 10/2025 Garg ................... H04L 63/1416
2025/0328341 A1* 10/2025 Gutierrez .............. G06F 3/0484
2025/0356725 A1* 11/2025 Nowak ............... G07F 17/3225
2025/0371426 A1* 12/2025 Fortkort ................. G06N 20/00
2025/0373639 A1* 12/2025 Emery ................ H04L 63/1425
2026/0046124 A1* 2/2026 Bandaru ................. H04L 9/088
2026/0075055 A1* 3/2026 Solnik ..................... H04L 63/10

OTHER PUBLICATIONS

Tang et al "Multi-Factor Web API Security for Securing Mobile Cloud," 2015 12th International Conference on Fuzzy Systems and Knowledge Discovery (FSKD), pp. 2163-2168 (Year: 2015).*

Manevich et al "Endorsement in Hyperledger Fabric via Service Discovery," pp. 2:1-2-9 (Year: 2019).*

Parsa et al "Securing Programs via Modeling and Efficient Enforcement of Access Control Policies," pp. 2118-2123 (Year: 2007).*

Suri et al "Enforcement of Communications Policies in Software Agent Systems Through Mobile Code," IEEE Computer Society, pp. 1-4 (Year: 2003).*

Dias et al "Enforcing History-Based Security Policies in Mobile Agent Systems," IEEE Computer Society pp. 1-4 (Year: 2003).*

Erlingsson et al "IRM Enforcement of Java Stack Inspection," IEEE, pp. 1-10 (Year: 2000).*

Evans et al "Flexible Policy-Driven Code Safety," IEEE Security and Privacy, pp. 1-14 (Year: 1999).*

* cited by examiner

EMBEDDED AND DISTRIBUTABLE POLICY ENFORCEMENT

RELATED APPLICATIONS

This patent application claims the benefit under 35 U.S.C. § 119(e) of U.S. Provisional Patent App. No. 63/182,918, filed May 1, 2021, entitled "EMBEDDED AND DISTRIBUTABLE POLICY ENFORCEMENT," incorporated herein by reference in entirety.

BACKGROUND

Electronic databases store tremendous amounts of data, and have been doing so for several decades ever since the cost of computer hardware came within reach for most businesses and consumers. Large "data warehouses" now store vast amounts of data stored and are indexed according to a storage format, often according to tables or multidimensional arrangements, and indices that allow access to the data though interfaces and software defined by the particular vendor. Multidimensional databases extend the notion of conventional tabular data by allowing an arbitrary number of dimensions to be associated with each data item. This often takes the form of a number of data tables—two dimensional storage arrangements—arranged as a set of dimension and fact tables, possibly stored in different physical storage volumes or locations, in a logical arrangement referred to as a datacube.

SUMMARY

An embedded policy takes the form of an executable entity local to the endpoint or end application attempting to access target data. The executable entity is compiled from a declarative remote policy based on objects, subjects and actions, and includes a library and API (Application Programming Interface) in conjunction with a client application seeking access according to the policy. Evaluation of appropriate access is resolved with a local function call to the executable entity, rather than a network message exchange, thus providing data target access according to the policy without incurring network latency.

Configurations herein are based, in part, on the observation that policy enforcement in information systems becomes increasingly important when many data targets serve many users and access afforded to each user may differ. Unfortunately, conventional approaches to coordinated access control suffers from the shortcoming that conventional approaches rely on locally configured policy or a message based policy implementation that incurs network latency for evaluating access requests and lacks granularity because finely differentiated access capabilities further increase latency, contributing to an overall performance issue. Accordingly, configurations herein substantially overcome the above-described shortcomings by providing an embedded policy executable entity that performs specific policy access evaluations based on a highly granular consideration of actors, assets and actions taken and returns quick authorizations through embedded library calls or invocations that do not incur a network exchange.

In further detail, a method, system and network device for enforcing an authorization policy as disclosed herein includes identifying an authorization policy based on declarative designations of a set of objects, subjects and actions affected by an access request, and distributing the executable entity to a plurality if endpoints of a network of users. Each endpoint of the plurality of endpoints has one or more client applications. The endpoint embeds the executable entity in the client application, the executable entity responsive to access requests from the client application, and the endpoint node grants the access request based on evaluating the access request against the authorization policy, evaluating based only on instructions in the executable entity.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Various configurations depicting the above features and benefits as disclosed herein are shown and described further below. Configurations disclosed herein allow embedded and distributed policy enforcement to extend to network endpoints, typically end users and applications accessing the data target. Access authorization occurs at the endpoint via an executable entity on the endpoint system (CPU, server, device) without imposing a barrage of network based exchanges for authorization.

Figure 1:
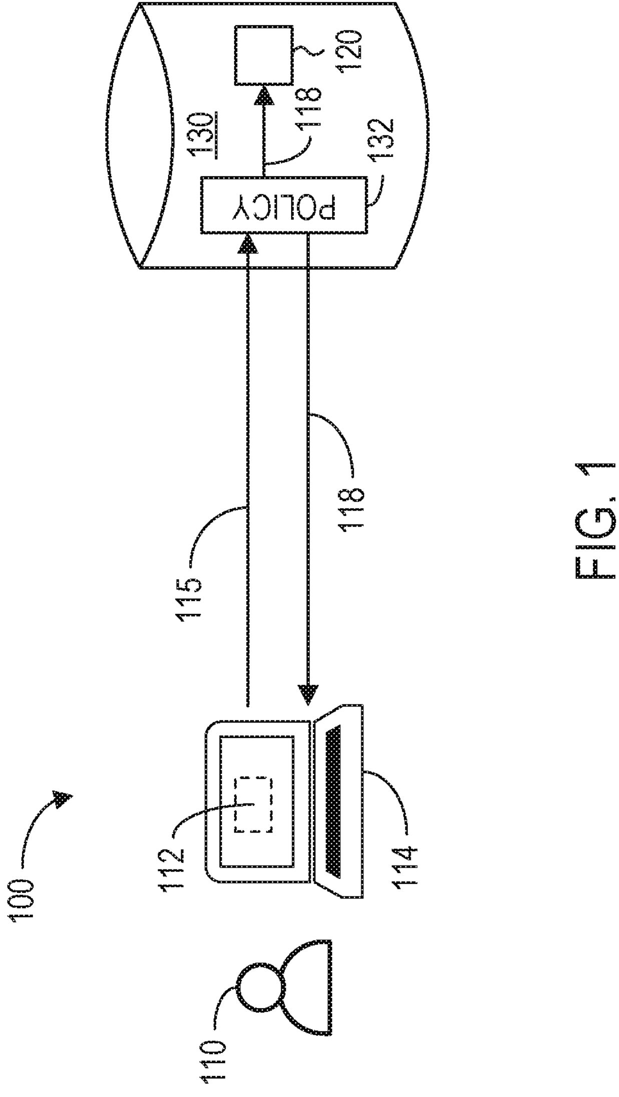
FIG. 1 is a context diagram of a data target environment suitable for configurations herein.

FIG. 1 is a context diagram of a data target environment suitable for configurations herein. Traditional data warehouse systems do not provide embedded and distributable access controls to allow/deny end users from retrieving stored data. Embodiments herein describe ways in which persons can control data access for a data warehouse through Policy Enforcement. Referring to FIG. 1, in the data target environment 100, generally, a user 110, such as an employee, seeks some item of information 120 from a data target 130. The data target 130 has an authorization policy 132 (policy) which indicates who may access particular items in the data target 130. The user 110 invokes an application 112 on a computing device 114 for requesting the data item 120. The computing device 114 defines an endpoint, meaning a network terminus of the transmission path of the item of information, and the point at which it is disseminated to the user 112. Intermediate transmission points, such as routers, hubs and other network transmission devices merely pass the data item 120 through.

The policy 132 evaluates the request 115 and allows the request to go through, shown by arrow 116, or denies the request and sends an indication 118 accordingly. The policy 132 may be regularly updated to reflect changes in actors (individuals, employees, groups, devices) that may access particular data target objects such as the data item 120, and may vary widely in complexity.

The data target 130 covered by the policy 132 includes any commonly located or distributed collection of data having a common thread, purpose, or ownership and designated for use by a designated user community. Such data target entities include any suitable entity or network location where structured data may be accessed, such as databases, web pages, URL object, JSON (Javascript Object Notation files, data warehouses, disk farms, storage servers and the like responsive to the common policy (policy).

Figure 2:
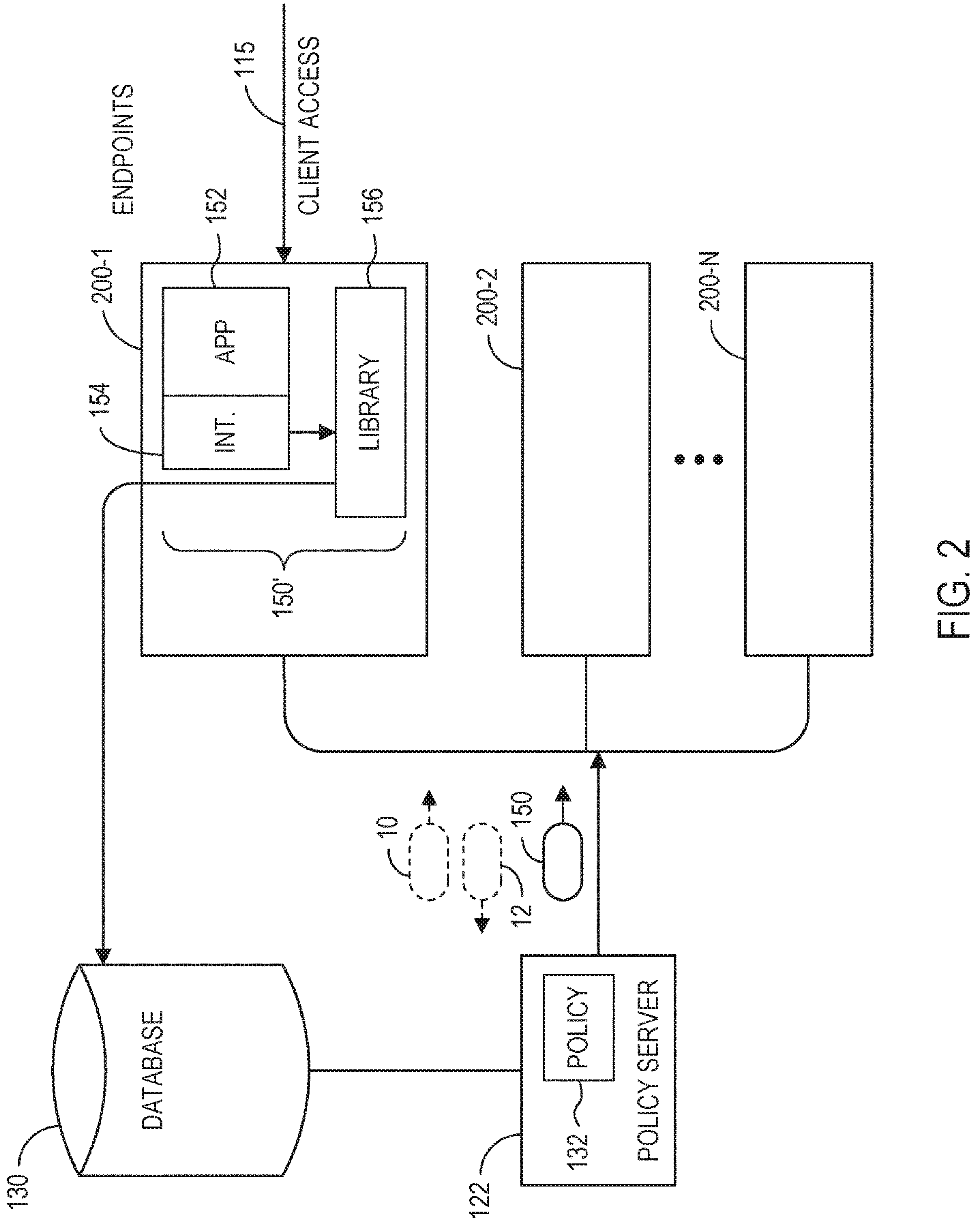
FIG. 2 is block diagram of an embedded executable entity in the environment of FIG. 1.

FIG. 2 is block diagram of an embedded executable entity in the environment of FIG. 1. Referring to FIGS. 1 and 2, the method for implementing the authorization policy 132 (policy) includes compiling an authorization policy into an executable entity 150.

The policy 132 is a collection of declarative rules or statements that govern the behaviors of network devices, often in response to human actions. In a business enterprise, for example, network administrators define policies for network devices to follow to achieve business objectives. Most often, a primary consideration is protection of sensitive data. A policy server 122 distributes the executable entity 150 to a plurality of endpoints 200-1 . . . 200-3 (200 generally) of a network of users, and each endpoint 200 of the plurality of endpoints has a client application 152 responsive to the user 110. Each endpoint 200 is defined by a computing device 114 including memory and a processor operable for generating a access request 115. The endpoint 200 embeds the executable entity in the client application 152, such that the executable entity is responsive to access requests 115 from the client application.

The resulting embedded executable entity 150' is codified in executable code in the memory system on which the proxy or embedded application launches and executes. The embedded executable entity 154 grants the access request 115 based on evaluation of the access request 115 against the authorization policy 132, such that evaluating is based only on instructions in the executable entity. Evaluating the access request 115 therefore occurs without network exchanges with the server 122 from which the authorization policy 132 emanated. In contrast, conventional approaches would require a network exchange including an authorization request message 10 and a corresponding response 12, both incurring a network latency. With a large number of queries/requests, such latency becomes untenable, particularly if there is a finer granularity in the authorization approach.

The executable entity 150 may be implemented as a library 156, having an API (Application Programming Interface) and invoked from API calls from the client application 152. The embedded executable entity then takes the form of an API interface 154 invoking the API in the library. The client application 152 is developed with exposure to the API such that the proper calls for policy authorization are embedded in the client application 152.

Updates and revisions to the policy, as well as initial distribution, are performed by storing the embedded executable policy 154 in the endpoint 200. The endpoint then links the library 156 with the client application 152 to resolve references (i.e. calls) to the API from the client application.

Figure 3:
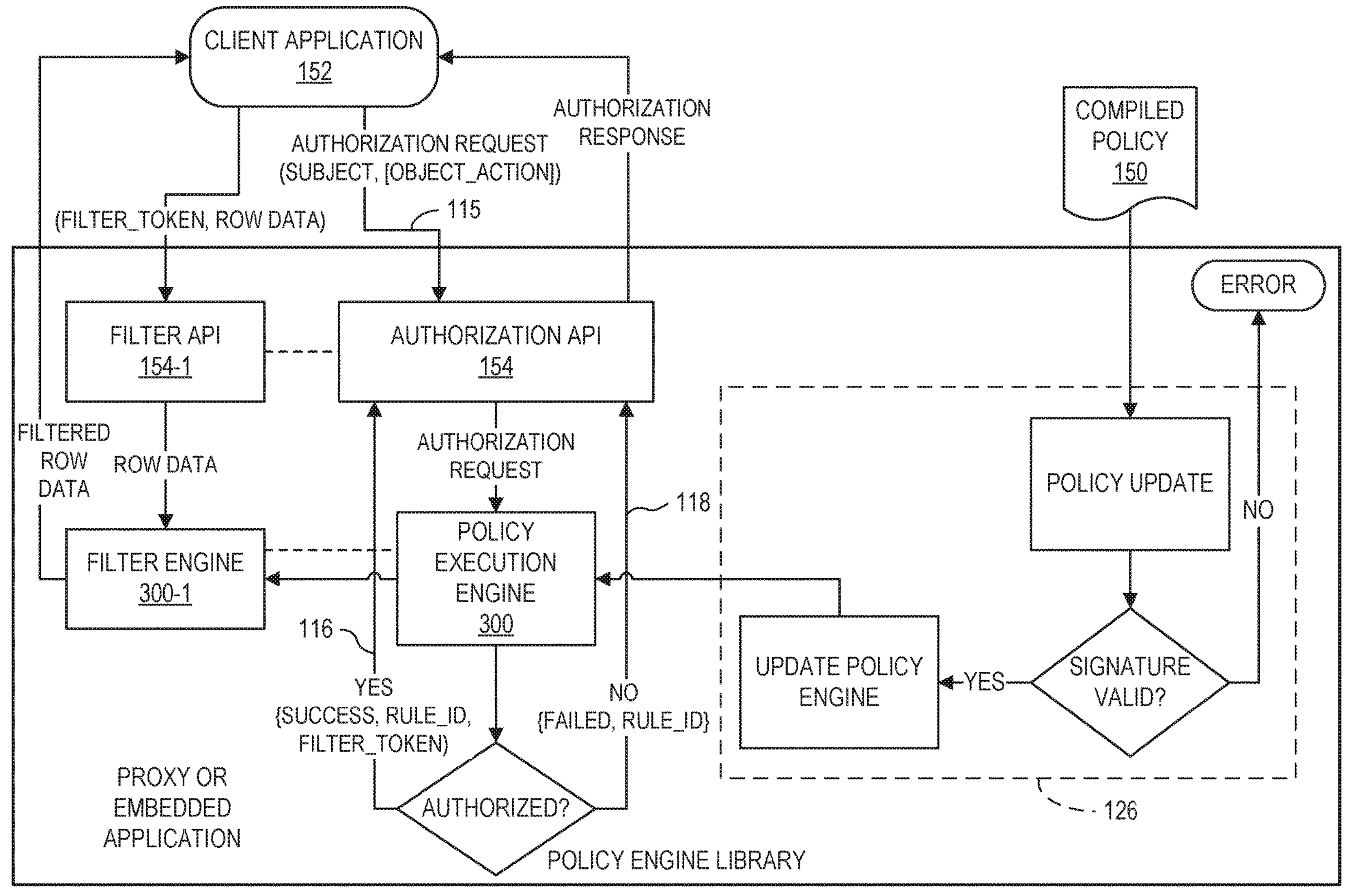
FIG. 3 is a data and logic flow depicting the policy implemented by the executable entity of FIG. 2.

FIG. 3 is a data and logic flow depicting the policy implemented by the executable entity of FIG. 2. Referring to FIGS. 1-3, declarative policies are compiled into an executable object 150 called the Policy Execution Engine 126 which can be distributed and instantiated in one or more endpoints 200.

Once the engine is distributed to endpoint(s), it is then evaluated for correctness. If the object evaluation fails, reject and send an error to the caller, otherwise continue with the embedding and distribution process. Policy updates occur by updates to the executable entity, such as version or revision changes. The policy 132 is distributed as an executable entity 156, meaning a run time body of code linked or embedded with a client application 152 via a library and/or API (Application Programming Interface). The executable entity and library will be distributed directly from a central server 122. If any existing policy exists within the system, it is first replaced by this new executable object, and policy updates and revisions are implemented in this manner.

Once current, any authorization requests are sent through the Application Programming Interface (API) or Library 154 which performs the request against the execution engine, giving either an "allow" or "deny."

For example, suppose a data warehouse contains sensitive data (e.g PII, Social Security Numbers) which should not be accessed by any end user outside of a very few select authorized individuals.

First a declarative authorization policy is written to reject any requests for all users outside with the exception of the "authorized" group of users. It is then compiled and distributed to endpoints 200. The declarative nature generally means a list or set of rules of logic expressions expressing a Boolean result as to whether to grant access.

After evaluating for correctness and replacing any existing policy execution engines, the new executable object is ready to handle authorization requests.

When a user attempts to access this sensitive data, the request is passed through the API 154 and down to the execution engine 300. The engine will evaluate the user submitting the request, action, and target against the policy to determine if the request should be allowed 116 or denied. If allowed, the request proceeds and returns data to the calling user.

Otherwise, the request is rejected 118 and an error with reasons for rejection are sent back to the user.

Particular extensions to the absolute rejection or accommodation for a request includes a filter engine 300-1 and a filter API 154-1. On occasion, only part of a query request may trigger an authorization concern. In such a case, the data may be truncated or augmented so that the remaining data is permitted. For example, a request for a social security number or credit card may be limited to only the last 4 digits. Or, if a query is too selective that it might reveal an identity, a more generic query may be substituted. For example, a seemingly generic query for the number of employees (not identities) with a high salary may seem benign. However, if this is further qualified by the employees from a certain town, and it is common knowledge that only 1 employee lives in that town, such a query would effectively reveal salary information. In such an instance, the query could be permitted without the excessively narrowing term.

Figure 4:
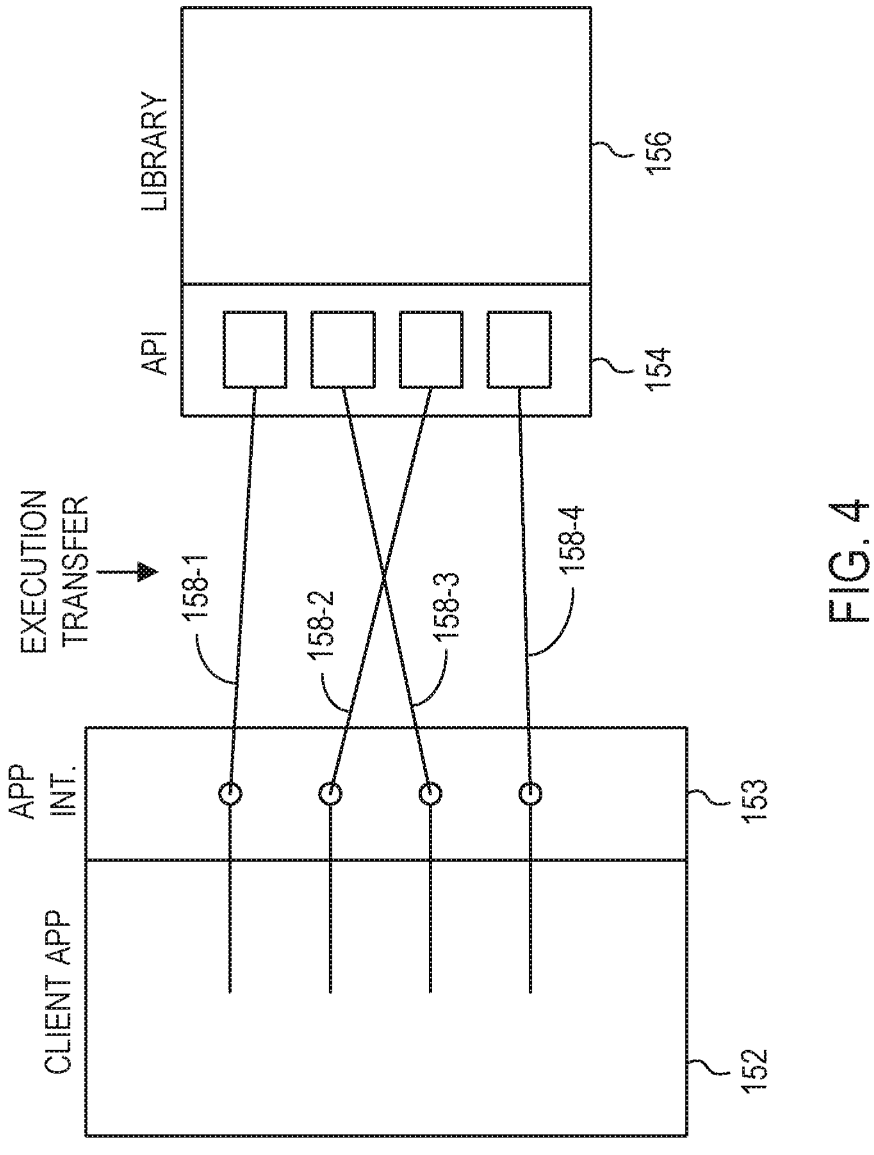
FIG. 4 shows an architecture diagram of an executable entity according to FIGS. 1-3.

FIG. 4 shows an architecture diagram of an executable entity according to FIGS. 1-3. Deployment of the executable entity 150 may take several forms. Generally it involves allowing the code for performing authorization according to the policy to be executed by the client application directly, without requiring a network exchange (and corresponding latency). This could be performed by object code linking of the executable entity 150 directly with the client application, however this would require rebuilding each client application 152 to correspond to policy 132 revisions.

In a particular arrangement, the executable entity 154 further comprises a library 156, API 154 and API calls 153 from the client application 152, such that the API calls correspond to code invocations 158-1 . . . 158-4 (158 generally) in the client application for transferring control to an API entry point corresponding to the API call. The client application need only an API interface reference 153 or address/entry point, rather than code instructions. Embedding therefore includes linking with the client application 152 and identifying library access points in the API 154 invoked from the client application 152, in which the library exists local to the endpoint 200 of the client application, i.e. runs locally in the same executable space as the library 156.

The resulting embedded executable entity 154 is codified in executable code in the memory system on which the proxy or embedded application launches and executes. The embedded executable entity 150' grants the access request 115 based on evaluation of the access request 115 against the authorization policy 132, such that the access evaluation is based only on instructions in the executable entity. Evaluating the access request 115 therefore occurs without network exchanges with the server 122 from which the authorization policy 132 emanated. In contrast, conventional approaches would require a network exchange including an authorization request message 10 and a corresponding response 12, both incurring a network latency. With a large number of queries/requests, such latency becomes untenable, particularly if there is a finer granularity in the authorization approach.

The advantage of policy enforcement by an executable entity, and hence via software instruction invocation rather than network exchange, is multiplied in a large database system where policy authorizations are frequent. It may be recognized that modern computing infrastructure can tend to blur the distinction between network transactions and instruction execution in volatile memory, traditionally referred to as RAM (Random Access Memory) or main memory. Modern computer architectures, with CPU clusters and parallel processing, incorporate a so-called bus between the processors and memory. While modern network and routing can rival the performance of older bus structures in computer architecture, there remains an identifiable distinction between operations based on CPU instructions occurring in an addressable memory space, and an I/O request that invokes a network request relying on the 7 layer stack. The former does not incur beyond the application layer (7), while the latter traverses the stack. By performing authorization checks in an executable entity, network bound authorization exchanges are avoided, which can be substantial with a large data set.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as solid state drives (SSDs) and media, flash drives, floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions, including virtual machines and hypervisor controlled execution environments. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method for enforcing an authorization policy, comprising:

identifying an authorization policy based on declarative designations of a set of objects, subjects and actions affected by an access request;

distributing an executable entity based on the authorization policy to a plurality of endpoints of a network of users, each endpoint of the plurality of endpoints having a client application, the executable entity further comprising a library, and API calls, the API calls corresponding to code invocations in the client application for transferring control to an API entry point corresponding to the API call;

embedding the executable entity in the client application, the executable entity responsive to access requests from the client application including linking with the client application and identifying library access points invoked from the client application, the library existing local to the endpoint of the client application;

receiving the access request at the client application, the access request indicating a data target covered by the authorization policy;

invoking instructions at the identified library access point of the executable entity, the executable entity codified in executable code, launched and executed in a computing device including memory and a processor upon which the client application executes, disposed between the client and the data target, the instructions invoked directly by the client application with an absence of network exchanges, the client application enforcing the authorization policy based on the invoked instructions; and granting the access request based on evaluating the access request against the authorization policy, evaluating based on code invocations of instructions in the executable entity and without network exchanges with the server from which the authorization policy emanated.

2. The method of claim 1 wherein the embedded executable entity is codified in executable code, launched and executed in a computing entity disposed between the client and the data target.

3. The method of claim 1 further comprising receiving the policy as a set of rules, the rules defining objects, subjects and actions, each rule indicative of an object, a subject permitted to access the object and at least one action the subject may perform on the object.

4. The method of claim 1 wherein distributing the executable entity further comprises:

storing the library and executable entity in a retrievable location;

authenticating an endpoint to receive the executable entity; and transmitting, based on the authentication, the library to the endpoint.

5. The method of claim 1 wherein distributing the executable entity further comprises:

storing the library and executable entity in a retrievable location;

authenticating an endpoint to receive the executable entity; and transmitting, based on the authentication, the library to the endpoint.

6. A network device for database access, further comprising:

a query interface to a multidimensional database responsive to access requests from a user according to the method of claim 1.

7. The device of claim 6 wherein the executable entity further comprises a library, and API responsive to API calls, the API calls corresponding to code invocations in the client application for transferring control to an API entry point corresponding to the API call.

8. The method of claim 6 wherein the embedded executable entity is codified in executable code and the memory space disposed in a network between the client and the data target.

9. The device of any of claim 6 wherein evaluating the access request occurs without network exchanges with the server from which the authorization policy emanated.

10. The device of claim 6 wherein the received policy includes a set of rules, the rules defining objects, subjects and actions, each rule indicative of an object, a subject permitted to access the object and at least one action the subject may perform on the object.

11. The device of claim 6 wherein the executable entity further comprises:

the library and executable entity stored in the memory space from an interface with the policy server; and an authenticated endpoint to receive the executable entity; and the interface for transmitting, based on the authentication, the library to the endpoint.

12. The method of claim 1 further comprising invoking instructions in an entry point in the same process and memory space as the client application.

13. A computer program embodying program code on a non-transitory computer readable storage medium storing instructions that, when executed by a processor, performs steps for implementing a method for enforcing an authorization policy, the method comprising:

identifying an authorization policy based on declarative designations of a set of objects, subjects and actions affected by an access request;

distributing the executable entity to a plurality of endpoints of a network of users, each endpoint of the plurality of endpoints having a client application, the executable entity further comprising a library, and API calls, the API calls corresponding to code invocations in the client application for transferring control to an API entry point corresponding to the API call; and embedding the executable entity in the client application, the executable entity responsive to access requests from the client application including linking with the client application and identifying library access points invoked from the client application, the library existing local to the endpoint of the client application;

receiving the access request at the client application, the access request indicating a data target covered by the authorization policy;

invoking instructions at the identified library access point of the executable entity, the executable entity codified in executable code, launched and executed in a computing device including memory and a processor upon which the client application executes, disposed between the client and the data target, the instructions invoked directly by the client application with an absence of network exchanges, the client application enforcing the authorization policy based on the invoked instructions; and granting the access request based on evaluating the access request against the authorization policy, evaluating based on code invocations of instructions in the executable entity and without network exchanges with the server from which the authorization policy emanated.

* * * * *